(12) United States Patent
Huang et al.

(10) Patent No.: US 10,559,876 B2
(45) Date of Patent: Feb. 11, 2020

(54) ANTENNA DEVICE

(71) Applicant: HIRSCHMANN CAR COMMUNICATION GMBH, Neckartenzlingen (DE)

(72) Inventors: Jian Huang, Shanghai (CN); Xu Zhang, Shanghai (CN); Le Chen, Shanghai (CN); Yunguang Xun, Shanghai (CN); Liantao Jiang, Shanghai (CN)

(73) Assignee: Hirschmann Car Communication GMBH, Neckartenzlingen (DE)

( * ) Notice: Subject to any disclaimer, the term of this patent is extended or adjusted under 35 U.S.C. 154(b) by 0 days.

(21) Appl. No.: 16/357,391

(22) Filed: Mar. 19, 2019

(65) Prior Publication Data

US 2019/0214713 A1 Jul. 11, 2019

Related U.S. Application Data

(63) Continuation of application No. PCT/EP2017/073795, filed on Sep. 20, 2017.

(30) Foreign Application Priority Data

Sep. 21, 2016 (CN) .......................... 2016 1 0840215

(51) Int. Cl.
*H04M 1/00* (2006.01)
*H01Q 1/32* (2006.01)
(Continued)

(52) U.S. Cl.
CPC ......... *H01Q 1/3275* (2013.01); *H01Q 1/1214* (2013.01); *H01Q 1/241* (2013.01);
(Continued)

(58) Field of Classification Search
CPC .... H01Q 1/3275; H01Q 1/1214; H01Q 1/241; H01Q 1/362; H01Q 7/00; H01Q 1/42; H04B 1/082; H04B 7/0404
(Continued)

(56) References Cited

U.S. PATENT DOCUMENTS 5,686,928 A * 11/1997 Pritchett .............. H01Q 1/3225
343/711
8,816,917 B2 * 8/2014 Ueno ................... H01Q 1/3275
343/713
(Continued)

FOREIGN PATENT DOCUMENTS

CN 202405568 U 10/2012
WO 2014/204494 A1 12/2014
WO 2016/032624 A1 3/2016

*Primary Examiner* — Marceau Milord
(74) *Attorney, Agent, or Firm* — Saxton & Stump, LLC

(57) ABSTRACT

The present invention relates to an antenna apparatus, which has an antenna cover and a base, the antenna cover being fixed onto the base to form a sealed waterproof space, wherein a first antenna assembly is disposed in the sealed waterproof space, the first antenna assembly comprising: an antenna element support; an antenna element fixedly wound around the antenna element support, the antenna element being composed of a spiral-like winding and an inductance coil; and an amplifier substrate fixed onto the base and connected to the antenna element. The antenna apparatus is applicable to frequency bands such as AM/FM, DAB/DMB, and TV, and has advantages of having a small size, low costs, high space utilization, etc.

20 Claims, 1 Drawing Sheet

(51) Int. Cl.
*H01Q 1/36* (2006.01)
*H01Q 9/27* (2006.01)
*H01Q 1/12* (2006.01)
*H01Q 1/24* (2006.01)
*H01Q 7/00* (2006.01)
*H04B 1/08* (2006.01)
*H04B 7/0404* (2017.01)
*H01Q 1/42* (2006.01)

(52) U.S. Cl.
CPC ............... *H01Q 1/362* (2013.01); *H01Q 7/00* (2013.01); *H01Q 9/27* (2013.01); *H04B 1/082* (2013.01); *H04B 7/0404* (2013.01); *H01Q 1/42* (2013.01)

(58) Field of Classification Search
USPC .......... 455/552.1, 575.4, 575.5, 575.8, 575.9
See application file for complete search history.

(56) References Cited

U.S. PATENT DOCUMENTS

| | | | | |
|---|---|---|---|---|
| 9,954,274 B2* | 4/2018 | Nakada | ................ | H01Q 1/3275 |
| 10,074,895 B2* | 9/2018 | Sugimoto | ................ | H01Q 1/42 |
| 2008/0117111 A1* | 5/2008 | Ikeda | ................... | H01Q 1/1214 |
| | | | | 343/713 |
| 2008/0198082 A1* | 8/2008 | Soler Castany | ....... | H01Q 1/242 |
| | | | | 343/770 |
| 2009/0207084 A1* | 8/2009 | Ikeda | ................... | H01Q 1/1207 |
| | | | | 343/713 |
| 2009/0267847 A1* | 10/2009 | Sato | ..................... | H01Q 1/3275 |
| | | | | 343/713 |
| 2010/0245145 A1* | 9/2010 | Motamed | ............. | H03M 1/682 |
| | | | | 341/144 |
| 2010/0245189 A1* | 9/2010 | Wang | ...................... | H01Q 1/32 |
| | | | | 343/713 |
| 2010/0265147 A1* | 10/2010 | Wakui | .................. | H01Q 1/3275 |
| | | | | 343/725 |
| 2013/0342405 A1* | 12/2013 | Ueno | ................... | H01Q 1/3275 |
| | | | | 343/713 |
| 2017/0062914 A1* | 3/2017 | Masaka | ................ | H01Q 1/1214 |

* cited by examiner

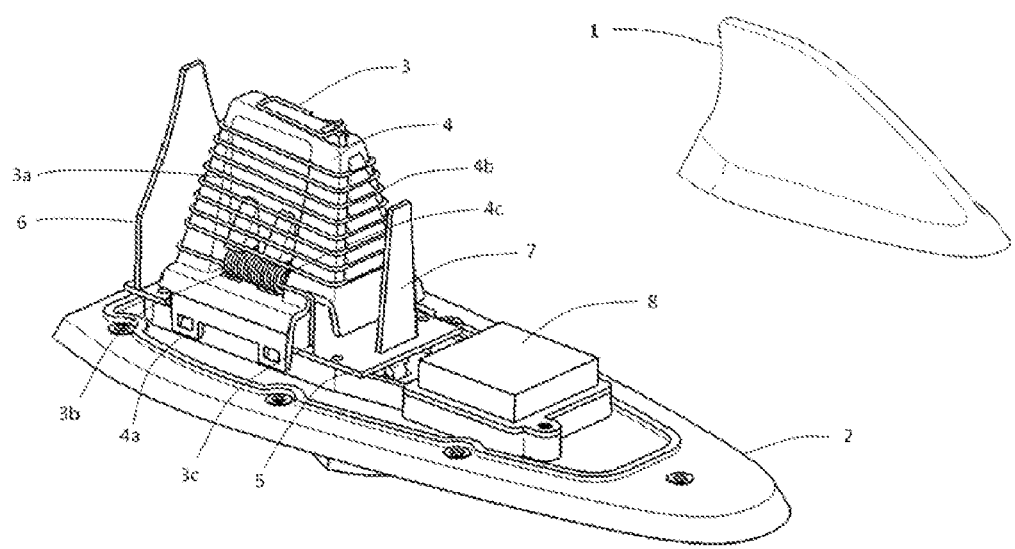

ANTENNA DEVICE

TECHNICAL FILED

The present invention relates to an antenna apparatus in the field of on-vehicle applications.

BACKGROUND

Currently, in the field of on-vehicle applications, there are mainly two implementations for antenna design of a broadcast receiving application (for example, AM/FM, DAB/DMB, and TV): one is a solution to integrate an antenna into a rear windshield to share a defogger wire therewith, and the other is a solution to integrate the antenna into a shark fin. Antenna applications use low frequency bands, and a relatively large space is required to implement the functions and performance of the antenna. Therefore, the former solution is more aesthetic than the latter. However, in development stages, antennas need to be separately developed for different models, resulting in long development periods and relatively high costs. The latter solution has simple development. The same design may be used as a modular product and can be applied to different models without any change. Therefore, the latter solution is significantly advantageous in reducing development investments and batch production costs. However, there are challenges in performance and implementation processes due to space limitations for aesthetic reasons. A current shark fin usually comprises a broadcast receiving antenna and a satellite navigation receiving antenna. In some shark fins, a cellular antenna is further added. Two antennas are required for 4G cellular communication. As new functions are further added, the space for each antenna in a shark fin is further reduced, and interference between the antennas further needs to be minimized.

In a current well-known shark fin, a broadcast receiving antenna mainly uses an axial-mode helical antenna or a magnetic helical antenna, a metal umbrella antenna, a PCB antenna, among other antenna patterns. The axial-mode helical antenna or magnetic helical antenna occupies the upper space of the entire shark fin and thus greatly affecting the layout of other antennas. The metal umbrella antenna needs to be supported, for example, by a substrate and equipped with an induction coil to improve the performance, resulting in relatively complex process implementation and a large occupied space. The PCB antenna has simple implementation but undesirable performance.

SUMMARY OF THE INVENTION

To overcome the foregoing disadvantages in the prior art, the present invention provides an antenna apparatus having a small size, a low cost, and high space utilization.

The purpose of the present invention is realized by following technical solutions:

an antenna apparatus, which comprises an antenna cover and a base, the antenna cover being fixed onto the base to form a sealed waterproof space, wherein a first antenna assembly is disposed in the sealed waterproof space, the first antenna assembly comprising:

an antenna element support;

an antenna element fixedly wound around the antenna element support, the antenna element being composed of a spiral-like winding and an inductance coil; and an amplifier substrate fixed onto the base and connected to the antenna element.

The antenna element support is perpendicularly fixed onto the base, and has a shape adapted to the antenna cover.

The antenna element is integrally formed using a metal wire winding process.

The spiral-like winding of the antenna element is implemented on a surface of the antenna element support by using LDS or 3D printing, and cooperates with the separate inductance coil.

The antenna element support is provided with a support positioning hook for fixing each turn of the spiral-like winding of the antenna element.

The antenna element support is provided with a limiting groove for limiting the inductance coil of the antenna element, and the inductance coil is located at an output terminal of the antenna element.

The antenna element is designed to perform reception in a single frequency band or combined reception in a plurality of frequency bands.

The amplifier substrate performs network matching on the antenna element, and amplifies and enhances a received signal.

The antenna apparatus further comprises:

a second antenna, the second antenna being mounted inside the sealed waterproof space and operatively configured to transmit and receive cellular signals; and a third antenna, the third antenna being mounted inside the sealed waterproof space and operatively configured to receive cellular signals, wherein the second antenna and the third antenna are respectively disposed on two sides of the antenna element support, and are perpendicularly fixed onto the amplifier substrate.

The antenna apparatus further comprises:

a fourth antenna, the fourth antenna being mounted inside the sealed waterproof space, fixed onto the base, and operatively configured to receive satellite navigation signals.

Compared with the prior art, the present invention has the following advantages:

1. Brand new implementation solution: An antenna element is wound around an antenna element support in a spiral-like manner using a metal wire winding process, facilitating adaptation according to different shapes of antenna covers. A spiral-like winding and an inductance coil of the antenna element are integrally formed. The coil is loaded with inductance to improve the signal radiation capability of the antenna element. In the present invention, the antenna element has a helical shape, so that the space in an antenna cover can be better utilized. The antenna element may also be implemented using LDS or 3D printing.

2. Small size design: The shapes of the antenna element and the antenna element support are adapted to the antenna cover, such that a smallest space can be used to achieve highest reception performance, thereby effectively improving the space utilization in an antenna apparatus. More functions such as a cellular antenna and a satellite navigation receiving antenna can be implemented in the same space.

3. Easy production: The inductance coil is added at an output terminal (that is, the antenna bottom) of the antenna element in the present invention, so that the production is simpler.

4. Reduced production cost: In the process of fabricating the antenna element, the spiral-like winding and the inductance coil are integrally combined. The antenna element is fixed and supported by the antenna element support, thereby reducing components of the antenna, simplifying the assembly procedure, improving the production efficiency, and reducing the production costs.

5. Functional modularization: A broadcast receiving antenna, a cellular antenna, a satellite navigation receiving antenna, and the like can be integrated.

6. Appropriate structural layout: The antenna element is perpendicularly disposed, so that the interference between the antenna apparatus and another antenna is reduced.

BRIEF DESCRIPTION OF DRAWINGS

FIG. 1 is a schematic structural view of the present invention.

Reference numerals in FIG. 1:

1. antenna cover, 2. base, 3. antenna element, 3a. spiral-like winding, 3b. inductance coil, 3c. output terminal of the antenna element, 4. antenna element support, 4a. antenna support bottom snap-fit opening, 4b. support positioning hook, 4c. limiting groove, 5. amplifier substrate, 6. second antenna, 7. third antenna, and 8. fourth antenna.

DETAILED DESCRIPTION OF EMBODIMENTS

The present invention will be described in detail below in conjunction with the accompanying drawings and specific embodiments. The embodiments are implemented under the premise of the technical solution of the present invention and give a detailed implementation and procedure. However, the scope of protection of the present invention includes, but is not limited to, the following embodiments.

As shown in FIG. 1, this embodiment provides an antenna apparatus, comprising an antenna cover 1 and a base 2. The antenna cover 1 is fixed onto the base 2 comprising a sealing ring by a positioning stud and a screw to form a sealed waterproof space. A first antenna assembly is disposed in the sealed waterproof space. The first antenna assembly comprises an antenna element support 4, an antenna element 3, and an amplifier substrate 5. The antenna element support 4 is perpendicularly fixed onto the base 2, and has a shape adapted to the antenna cover 1. The antenna element 3 is fixedly wound around the antenna element support 4. The amplifier substrate 5 is fixed onto the base 2 and welded with an output terminal 3c of the antenna element. The amplifier substrate 5 performs impedance matching on signals to obtain a flat frequency response, and then amplifies the signals for output. The signals are transmitted via radio waves. The antenna element is set to resonate in a corresponding frequency band, converts a radio wave received through induction into micro current signals, and transmits the micro current signals to a back-end low noise amplifier for amplification.

The antenna element 3 is integrally wound around the antenna element support 4 in a spiral-like manner using a metal wire winding process. The spiral-like winding 3a and an inductance coil 3b of the antenna element 3 are integrally formed, to facilitate the fitting with the antenna element support 4. For the spiral-like winding, a pattern of a vertical projection from the top of the spiral-like winding comprises, but is not limited to, a rectangular spiral with rounded corners, a triangular spiral with rounded corners, or a circular spiral. The antenna element support 4 is provided with a support positioning hook 4b, which is used to fix each metal wire winding of the antenna element 3, and a limiting groove 4c, which is used to limit the inductance coil 3b of the antenna element 3. The antenna element support 4 is snap-fitted with the base 2 by using antenna support bottom snap-fit openings 4a. In this embodiment, the antenna cover 1 is a shark fin antenna cover. The antenna element support 4 has a shape that narrows from bottom to top, so that the space in the antenna cover is effectively utilized. By using the structure of the antenna element support and the forming process of the antenna element, the antenna apparatus of the present invention can be more desirably applied to an in-vehicle shark fin apparatus and cost less.

In another embodiment of the present invention, the spiral-like winding 3a of the antenna element 3 is wound around the antenna element support 4 by using LDS or 3D printing, and cooperates with the separate inductance coil 3b.

In another embodiment of the present invention, the antenna apparatus further comprises a second antenna 6 and a third antenna 7 mounted inside the sealed waterproof space. The second antenna 6 may be operatively configured to transmit and receive cellular signals. The third antenna 7 may be operatively configured to receive cellular signals. In this embodiment, the second antenna 6 may be a 4G main/3G/2G antenna. The third antenna 7 may be a 4G diversity antenna. The 4G main/3G/2G antenna and the 4G diversity antenna are respectively connected to the amplifier substrate 5. The 4G main/3G/2G antenna and the 4G diversity antenna are distributed on two sides of the antenna element support 4, and are perpendicularly fixed onto the amplifier substrate 5.

In another embodiment of the present invention, the antenna apparatus further comprises a fourth antenna 8 mounted inside the sealed waterproof space. The fourth antenna 8 may be operatively configured to receive satellite navigation signals.

The invention claimed is:

1. An antenna apparatus, which comprises an antenna cover and a base, the antenna cover being fixed onto the base to form a sealed waterproof space, wherein a first antenna assembly is disposed in the sealed waterproof space, the first antenna assembly comprising:

an antenna element support, the antenna element support is perpendicularly supported on the base, and has a shape adapted to the antenna cover; an antenna element wound around and supported on the antenna element support, the antenna element comprising a spiral-like winding and an integrally formed inductance coil, the antenna element support is provided with a limiting groove for limiting the inductance coil of the antenna element, the inductance coil being located at an output terminal of the antenna element; and an amplifier substrate supported onto the base and connected to the antenna element.

2. The antenna apparatus according to claim 1, wherein the antenna element is integrally formed using a metal wire winding process.

3. The antenna apparatus according to claim 1, wherein the spiral-like winding of the antenna element is formed on a surface of the antenna element support by using LDS or 3D printing, and cooperates with the inductance coil, which is separately formed.

4. The antenna apparatus according to claim 1, wherein the antenna element support is provided with support positioning hooks for supporting turns of the spiral-like winding of the antenna element.

5. The antenna apparatus according to claim 1, wherein the antenna element is capable of performing reception in a single frequency band or combined reception in a plurality of frequency bands.

6. The antenna apparatus according to claim 1, wherein the amplifier substrate performs network matching on the antenna element and amplifies and enhances a received signal.

7. The antenna apparatus according to claim 1, wherein the amplifier substrate performs impedance matching on signals to obtain a flat frequency response.

8. The antenna apparatus according to claim 1, wherein the antenna element is set to resonate in a corresponding frequency band and converts a radio wave received through induction into micro current signals.

9. The antenna apparatus according to claim 1, wherein the antenna element is integrally wound around the antenna element support in a spiral-like manner through a metal wire winding process.

10. The antenna apparatus according to claim 1, wherein the spiral-like winding and the inductance coil of the antenna element are integrally formed.

11. The antenna apparatus according to claim 1, wherein the spiral-like winding has a spiral pattern in a vertical projection viewing from the top of the spiral-like winding.

12. The antenna apparatus according to claim 11, wherein the spiral pattern comprises a rectangular spiral with rounded corners, a triangular spiral with rounded corners, or a circular spiral.

13. The antenna apparatus according to claim 1, wherein the antenna element is formed by a wire material.

14. An antenna apparatus, which comprises an antenna cover and a base, the antenna cover being fixed onto the base to form a sealed waterproof space, wherein a first antenna assembly is disposed in the sealed waterproof space, the first antenna assembly comprising: an antenna element support; an antenna element wound around and supported on the antenna element support, the antenna element comprising a spiral-like winding and an inductance coil; an amplifier substrate supported onto the base and connected to the antenna element; a second antenna, the second antenna being mounted inside the sealed waterproof space; and a third antenna, the third antenna being mounted inside the sealed waterproof space; wherein the second antenna and the third antenna are respectively disposed on two sides of the antenna element support and are perpendicularly supported on the amplifier substrate.

15. The antenna apparatus according to claim 14, further comprising: a fourth antenna, the fourth antenna being mounted inside the sealed waterproof space and supported on the base, and being operatively configured to receive satellite navigation signals.

16. The antenna apparatus according to claim 14, wherein the second antenna comprises a 4G main/3G/2G antenna and the third antenna comprises a 4G diversity antenna.

17. The antenna apparatus according to claim 14, wherein the antenna element is integrally formed using a metal wire winding process.

18. The antenna apparatus according to claim 14, wherein the amplifier substrate performs network matching on the antenna element and amplifies and enhances a received signal.

19. The antenna apparatus according to claim 14, wherein the amplifier substrate performs impedance matching on signals to obtain a flat frequency response.

20. The antenna apparatus according to claim 14, wherein the spiral-like winding has a spiral pattern in a vertical projection viewing from the top of the spiral-like winding.

* * * * *